United States Patent [19]

O'Reilly

[11] Patent Number: 4,492,591
[45] Date of Patent: Jan. 8, 1985

[54] METHOD AND APPARATUS FOR RECOVERING HYDROGEN FROM A FEED COMPRISING METHANE, ETHYLENE, HYDROGEN AND ACETYLENE

[75] Inventor: Richard O'Reilly, Fetchem, England

[73] Assignee: Air Products and Chemicals, Inc., Allentown, Pa.

[21] Appl. No.: 381,234

[22] Filed: May 24, 1982

[30] Foreign Application Priority Data

May 26, 1981 [GB] United Kingdom ............... 8115934

[51] Int. Cl.³ .................................................. F25J 3/02
[52] U.S. Cl. ............................................ 62/17; 62/20
[58] Field of Search ................. 62/17, 20, 9, 11; 55/63, 64, 65; 208/341, 342; 585/867, 534

[56] References Cited

U.S. PATENT DOCUMENTS 2,582,443  1/1962  Linn ........................................ 55/63

Primary Examiner—Frank Sever
Attorney, Agent, or Firm—Mark L. Rodgers; E. Eugene Innis; James C. Simmons

[57] ABSTRACT

Hydrogen is recovered from a feed comprising methane, ethylene, hydrogen and acetylene by first cooling the feed and then scrubbing the cooled feed with a scrubbing liquid selected from the group consisting of liquid ethylene, liquid propane, liquid ethane and mixtures thereof to remove substantially all the acetylene. The scrubbed gas is then further cooled to condense the methane and ethylene leaving gaseous hydrogen as product.

8 Claims, 1 Drawing Figure

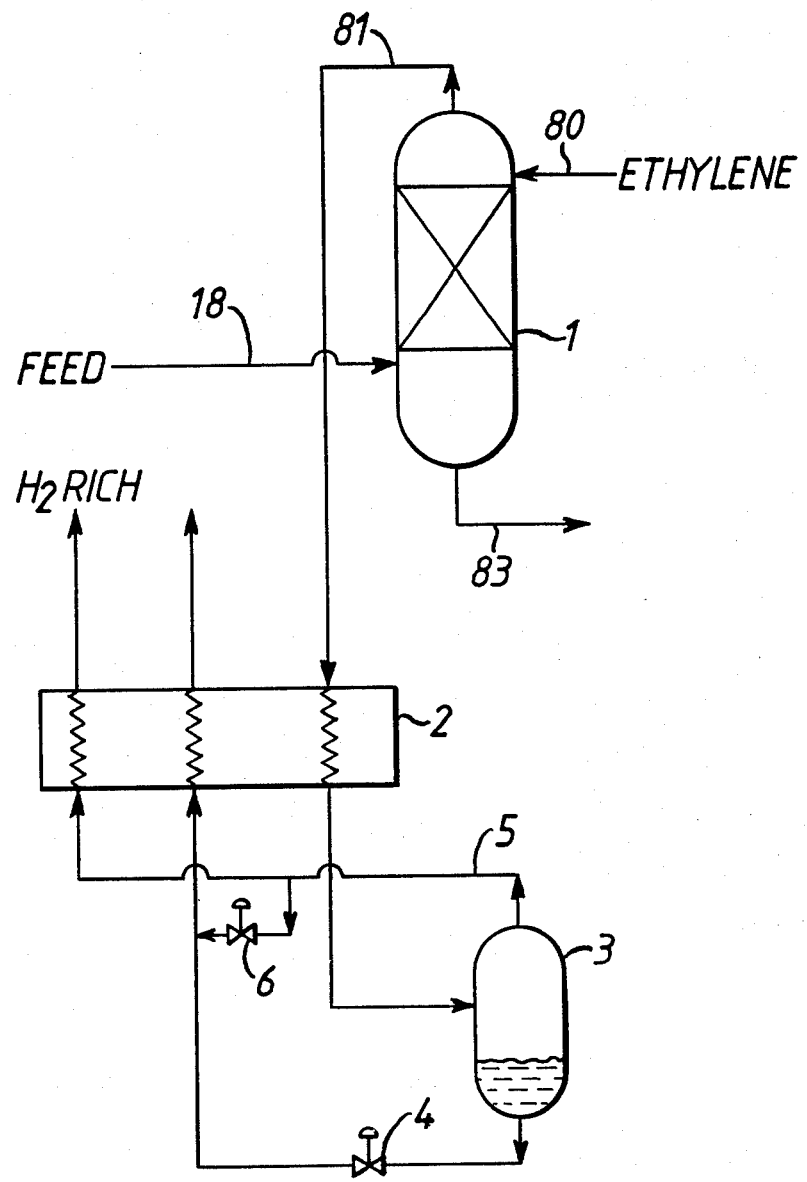

METHOD AND APPARATUS FOR RECOVERING HYDROGEN FROM A FEED COMPRISING METHANE, ETHYLENE, HYDROGEN AND ACETYLENE

This invention relates to a method and an apparatus for recovering hydrogen from a feed comprising methane, ethylene, hydrogen and acetylene.

During the industrial production of ethylene by, for example, cracking LPG, ethane, naptha or gasoil, a stream is produced which contains inter alia acetylene. Conventionally the acetylene is removed at the front end of the plant and hydrogen is subsequently recovered by cooling the remaining gasses, usually comprising methane, ethylene, ethane and hydrogen until all but the hydrogen liquify.

Should the acetylene not be removed then a number of problems would arise, particularly if high purity, i.e. greater than 96% (by volume) was required. Thus, if the mixture contained acetylene and was cooled to the appropriate temperature for obtaining hydrogen of such high purity the acetylene would solidify in the heat exchanger.

Unfortunately, there are no obvious solutions to this problem which are commercially acceptable. Thus, for example, use of an adsorbent is unacceptable since release of several tons of gaseous acetylene a day during regeneration presents obvious hazards in a refinery. Similarly, liquifaction and separation of the acetylene is impractical because of difficult process control and the inflexibility which it imposes on the operation of the hydrogen recovery unit as a whole.

In order to overcome this problem we propose to cool the gas containing the acetylene and then scrub it to remove the requisite amount of acetylene. The actual degree of scrubbing necessary is determined by the purity of the hydrogen required, thus the higher the purity required the lower the temperature to which the gas mixture has to be cooled and the more acetylene which has to be scrubbed out.

According to the present invention there is provided a method for recovering hydrogen from a feed comprising methane, ethylene, hydrogen and acetylene, which method comprises the steps of cooling said feed; scrubbing said cooled feed with a scrubbing liquid selected from the group comprising liquid ethylene, liquid propane, liquid ethane and mixtures thereof to absorb at least part of said acetylene; and subsequently further cooling the scrubbed feed to condense at least part of the methane and ethylene and leave a gaseous hydrogen product.

If the scrubbing liquid is liquid ethylene the feed is preferably cooled to between −82° C. and −115° C. and advantageously to −98° C. prior to scrubbing.

If the scrubbing liquid is liquid propane the feed is preferably cooled to between 0° C. and −40° C. and advantageously to −5° C. prior to scrubbing.

If the scrubbing liquid is liquid ethane the feed is preferably cooled to between 0° C. and −90° C. and advantageously to −50° C. prior to scrubbing.

The present invention also provides an apparatus for recovering hydrogen from a feed comprising methane, ethylene, hydrogen and acetylene, which apparatus comprises a heat exchanger for, in use, cooling said feed, and a scrubbing column in which, in use, at least part of said acetylene can be absorbed from said cooled feed by contact with a scrubbing liquid selected from the group comprising liquid ethylene, liquid propane, liquid ethane and mixtures thereof.

For a better understanding of the present invention and to show how the same may be carried into effect, reference will now be made, by way of example, to the accompanying drawing which shows a simplified flowsheet of an apparatus in accordance with the present invention.

Referring to the drawing, a gaseous feed stream 18, comprising hydrogen, methane, ethylene, ethane, acetylene and carbon monoxide is introduced into a scrubbing column 1.

The gaseous feed stream 18 is then scrubbed with a stream 80 of liquid ethylene which is introduced into the top of the scrubbing column 1. As it descends through the scrubbing column 1, the liquid ethylene absorbs the majority of acetylene present and leaves the scrubbing column as stream 83.

The temperature of the feed stream 18 and the ethylene entering the scrubbing column 1 is about −98° C. in each case.

The gas stream 81 leaving scrubbing column 1 is cooled to −167° C. in heat exchanger 2 and the resulting two phase mixture is separated in phase separator 3. Liquid from the bottom of the phase separator 3 comprising approximately 69% (by volume) methane and 29% ethylene is then expanded to 1.7 bars A across valve 4.

Gas, comprising 97.2% (by volume) hydrogen leaves the top of the phase separator 3 through conduit 5. About 9% of the gas is expanded across valve 6 and mixed with the two phase mixture leaving valve 4. The combined mixture is then warmed in heat exchanger 2 as shown. The balance of the gas leaving phase separator 3 is also warmed in heat exchanger 2 and led off as high purity hydrogen.

Full details of the compositions, temperatures and pressures of streams 18, 80, 81 and 83 are given in Table 1.

It will be appreciated that the stream 83 is liquid and can be introduced into, for example, the demethanizer column conventionally associated with an ethylene recovery plant. This can be achieved with minimal safety risk compared to regenerating gaseous acetylene from adsorbents together with the associated problem of disposal of the gaseous acetylene and contaminated regeneration gas used in regenerating the adsorbent.

TABLE 1

| Stream Number | 80 | 18 | 81 | 83 |
|---|---|---|---|---|
| Pressure (bars A) | 35.1 | 35.1 | 34.9 | 34.9 |
| Temperature (°C.) | −98 | −98 | −98 | −98 |
| Flow Rate (Moles/Hr) | | | | |
| H$_2$ | 0 | 542.1 | 541.1 | 1.0 |
| CO | 0 | 0.7 | 0.7 | 0.0 |
| CH$_4$ | 0 | 101.9 | 94.7 | 7.2 |
| Ethylene | 45.5 | 26.9 | 33.8 | 38.6 |
| Ethane | 0 | 4.07 | 0.07 | 4.0 |
| Acetylene | 0 | 0.75 | 0.05 | 0.7 |
| Phase | Liquid | Vapour | Vapour | Liquid |

I claim:

1. A method for recovering hydrogen from a feed comprising methane, ethylene, hydrogen and acetylene, which method comprises the steps of cooling said feed; scrubbing said cooled feed with a scrubbing liquid selected from the group consisting of liquid ethylene, liquid propane, liquid ethane and mixtures thereof to absorb at least part of said acetylene; and subsequently further cooling the scrubbed feed to condense at least part of the methane and ethylene and leave a gaseous, substantially acetylene-free hydrogen product of a purity of up to greater than 96% by volume.

2. A method according to claim 1, wherein said scrubbing liquid is liquid ethylene and said feed is cooled to between −82° C. and −115° C. prior to scrubbing.

3. A method according to claim 2, wherein said liquid ethylene is cooled to −98° C. prior to scrubbing.

4. A method according to claim 1, wherein said scrubbing liquid is liquid propane and said feed is cooled to between 0° C. and −40° C. prior to scrubbing.

5. A method according to claim 4, wherein said liquid propane is cooled to −5° C. prior to scrubbing.

6. A method according to claim 1, wherein said scrubbing liquid is liquid ethane and said feed is cooled to between 0° C. and −90° C. prior to scrubbing.

7. A method according to claim 6, wherein said scrubbing liquid is cooled to −50° C. prior to scrubbing.

8. An apparatus comprising: elements designed, sized and arranged for recovering substantially acetylene-free hydrogen up to greater than 96% purity, by volume from a feed stream comprising methane, ethylene, hydrogen and acetylene said elements including,
(a) a scrubbing column having a feed gas inlet, a scrubbing liquid inlet, a scrubbing liquid outlet and a gas stream outlet;
(b) a heat exchanger in fluid communication with the gas stream outlet of the scrubbing column, said heat exchanger having at least three separate fluid passages; and
(c) a phase separator having an inlet, a liquid outlet and a gas outlet, all being in fluid communication with separate fluid passages of the heat exchanger.

* * * * *